United States Patent [19]

Dietrich

[11] Patent Number: 4,834,589
[45] Date of Patent: May 30, 1989

[54] APPARATUS AND PROCESS FOR TRANSFERRING PULVERENT MATERIAL FROM A SUPPLY CONTAINER TO A DELIVERY POINT

[75] Inventor: Frederic Dietrich, Prilly, Switzerland

[73] Assignee: DEC Machinery S.A., Lausanne, Switzerland

[21] Appl. No.: 11,209

[22] Filed: Feb. 5, 1987

Related U.S. Application Data

[63] Continuation-in-part of Ser. No. 738,090, May 24, 1985, abandoned.

[30] Foreign Application Priority Data

Jun. 5, 1984 [CH] Switzerland ............... 2729/84

[51] Int. Cl.⁴ ............................... B65G 53/40
[52] U.S. Cl. ............................... 406/109; 406/122; 406/145; 406/50
[58] Field of Search ............... 406/50, 85, 96, 97, 406/105, 109, 121, 122, 114, 115, 145, 151, 181, 183; 141/65, 27; 220/202, 210, 352, 358, 367; 222/631, 383

[56] References Cited

U.S. PATENT DOCUMENTS

| | | | |
|---|---|---|---|
| 1,718,985 | 7/1929 | Scoville | 222/383 |
| 2,406,487 | 8/1946 | Brewer | 406/171 |
| 3,236,565 | 2/1966 | Kester et al. | 406/121 X |
| 3,257,150 | 6/1966 | Walsh | 406/171 X |
| 3,998,239 | 12/1976 | Kruishoop | 222/636 X |
| 4,085,975 | 4/1978 | Bilvist | 406/109 |
| 4,231,686 | 11/1980 | Sakamoto et al. | 406/109 X |
| 4,239,423 | 12/1980 | Sakamoto et al. | 406/109 X |
| 4,258,858 | 3/1981 | Russell | 220/218 X |
| 4,267,858 | 5/1981 | Lewis | 220/203 X |
| 4,360,294 | 11/1982 | Ahrens | 406/151 X |
| 4,378,183 | 3/1983 | Ackerman | 406/109 |
| 4,497,598 | 2/1985 | Blanton | 406/114 |
| 4,533,280 | 8/1985 | Elliott et al. | 406/114 X |

FOREIGN PATENT DOCUMENTS

| | | | |
|---|---|---|---|
| 874283 | 6/1971 | Canada | 406/146 |
| 2437799 | 2/1976 | Fed. Rep. of Germany | 406/109 |
| 52324 | 5/1981 | Japan | 406/122 |
| 656371 | 6/1986 | Switzerland | 406/50 |
| 197709 | 9/1977 | U.S.S.R. | 406/109 |
| 197712 | 11/1977 | U.S.S.R. | 406/142 |

*Primary Examiner*—Sherman D. Basinger
*Assistant Examiner*—Paul E. Salmon
*Attorney, Agent, or Firm*—Robert E. Burns; Emmanuel J. Lobato

[57] ABSTRACT

Apparatus and process for transferring pulverent material from a supply container to a delivery point comprises an elongate exhaust pipe having a first end and a second end with a filter near the second end, an intake pipe extending from the supply container to the first end of the exhaust pipe and a transfer pipe extending from the first end of the exhaust pipe to the delivery point. With the first end of the exhaust pipe connected with the intake pipe, suction is applied to the second end of the exhaust pipe to draw pulverent material from the supply container to and through the intake pipe into the exhaust pipe where it is blocked by the filter. The first end of the exhaust pipe is then connected with the transfer pipe and air under pressure is supplied to the second end of the exhaust pipe to propel the pulverent material from the exhaust pipe to and through the transfer pipe to the delivery point and to clear the filter.

15 Claims, 2 Drawing Sheets

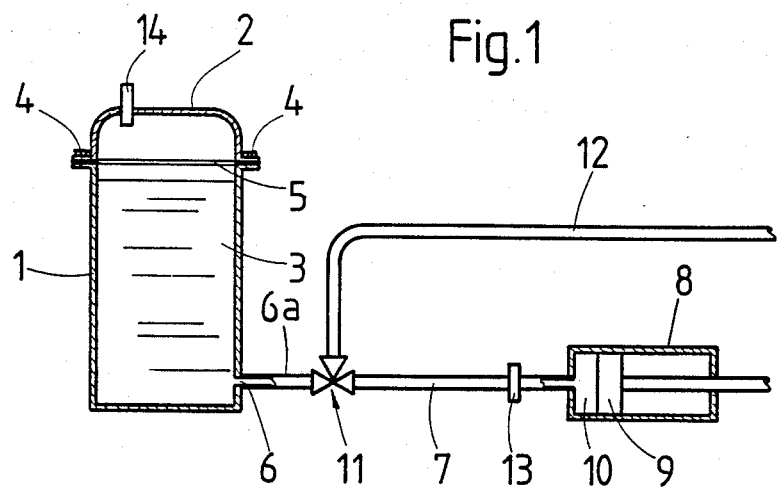
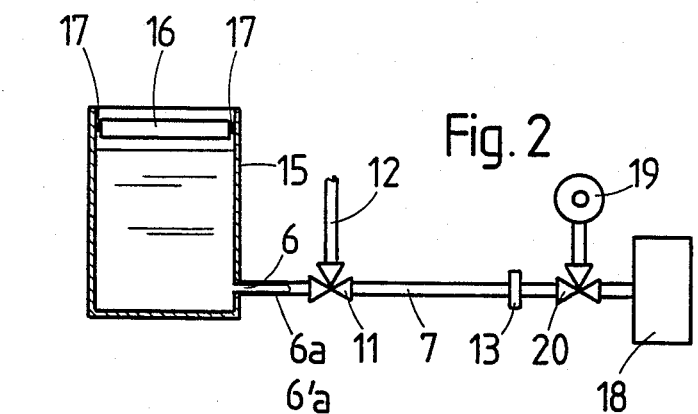
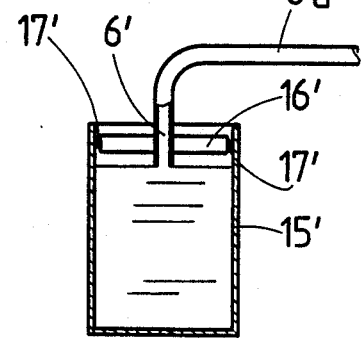
Fig. 1
Fig. 2
Fig. 3

APPARATUS AND PROCESS FOR TRANSFERRING PULVERENT MATERIAL FROM A SUPPLY CONTAINER TO A DELIVERY POINT

REFERENCE TO PRIOR APPLICATION

This application is a continuation-in-part of application Ser. No. 738,090 filed May 24, 1985, now abandoned.

BACKGROUND OF THE INVENTION

The present invention relates to a method of transferring pulverulent or pasty products from a tank and also to apparatus for carrying out this method.

Products in the form of powder, such as cement, meal, coloring matters, and the like, as well as pasty products manufactured or not from pulverulent raw materials are normally subjected, during their manufacture or the manufacture of other products of which they are component elements, to transfer steps toward equipments for metering, mixing and/or treating them.

THE PRIOR ART

Various methods have already been proposed for carrying out these steps. A known proposition consisted in exhausting the product stored in a tank and directing this product into a chamber or pipe section, and subsequently exerting a pressure against the mass of product after connecting this chamber or pipe section to a transfer pipe. If the product to be transferred is a powder, it is swollen upstream to facilitate its transfer. However, this procedure is objectionable in that it implies a loss of power (for swelling the powder) and makes it impossible to perform a volumetric proportioning of the product, since the latter is swollen. If the product is a paste or dough, the transfer is more or less difficult, according to its viscosity, and on the other hand a substantial amount of product is likely to stick to the tank walls, thus causing a loss of material.

SUMMARY OF THE INVENTION

The various inconveniences of the prior art method mentioned hereinabove are avoided by the present invention which provides a method permitting of transferring the pulverulent products without any preliminary swelling thereof and limiting or even eliminating the loss of material when pasty products are treated.

The method of the present invention is characterised by the fact that the tank containing the product to be transferred is tightly closed, that a predetermined amount of the product is exhausted through an orifice of said tank into an exhaust pipe, that the communication between said pipe and the tank is discontinued, that the exhaust pipe communicates with a transfer pipe, that the product is expelled from the exhaust pipe to the transfer pipe, that the communication is discontinued between the two pipes and restored between the tank and the exhaust pipe, and so forth.

By tightly closing the tank the transfer of product is greatly facilitated, during the exhaust step, by the vacuum created in the tank, thus dispensing with the necessity of swelling a pulverulent product, and reducing or even eliminating the loss of pasty products sticking to the inner walls of the tank.

According to a preferred form of embodiment of the method of this invention, a limit value is set for the vacuum produced in the tank to avoid any risk of implosion therein. Furthermore, for preventing any overstepping of this limit value the tank is provided either with a safety valve or with a cover movable vertically in a fluid-tight manner in the tank as a consequence of the vacuum created therein.

According to another modified form of embodiment, the suction orifice of the tank is located in the lower portion thereof so that the suction is promoted by the weight of the product contained in the tank, thus facilitating the operation during the suction step and saving power.

Finally, it is also possible to perform a volumetric proportioning or metering of the product in the pipe section, the volume of a predetermined pipe section corresponding to one dose of this product. This proportioning step is particularly accurate in the case of pulverulent products, on the one hand because they have not been swollen before hand and on the other hand since the tank is closed in a fluid-tight manner, no air can be drawn through the product and thus give a wrong result.

This invention is also concerned with an apparatus for carrying out the above-described method, and four different arrangement of said means are described hereafter with reference to the accompanying drawing.

IN THE DRAWINGS

FIG. 1 is a diagrammatic, part-sectional view showing a first form of embodiment of an apparatus for carrying out the method of the invention;

FIG. 2 is a diagrammatic and fragmentary view showing a second form of embodiment of the apparatus, FIG. 3 is a fragmentary diagrammatic view of a third form of embodiment of the apparatus.

DESCRIPTION OF PREFERRED EMBODIMENTS

Figure 4:
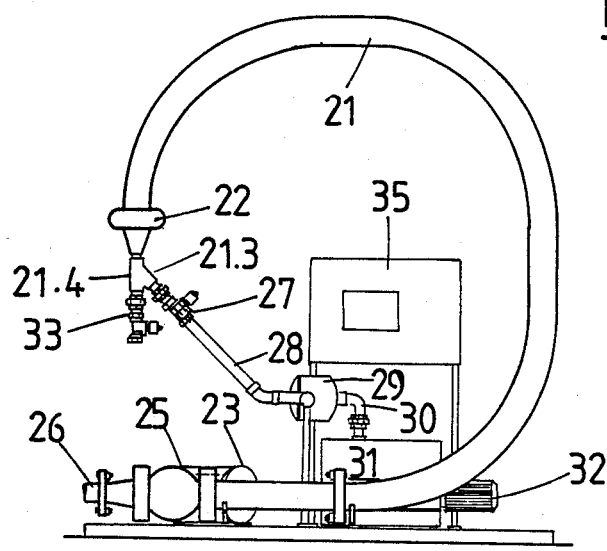
FIG. 4 is a schematic elevational view of a fourth form of embodiment of the apparatus.

A clearer understanding of the method of the present invention will be obtained from the following description of the three forms of embodiment of the apparatus devised for carrying out this method.

In this first form of embodiment the apparatus (FIG. 1) comprises a tank or like vessel 1 closed by a detachable cover 2 and adapted to be filled with the product 3 to be transferred. After filling the tank 1 with the product 3, the cover 2 is fitted to the top of the tank with the interposition of a suitable gasket 5, screw 4 or clamps being used for tightly closing the tank. An outlet orifice 6 is provided at the lower portion of the tank 1 and connected by an intake pipe 6a to a first end 7a of an exhaust pipe 7 having its opposite second end 7b connected to an exhaust-and-force device 8 conssisting in the present instance of a piston 9 slidably and tightly mounted in a cylindrical chamber 10 and driven for example by a double-acting pneumatic cylinder (not shown). A three-way valve 11 is provided for communicating the first end 7a of the exhaust pipe 7 either with the tank 1 or with a transfer pipe 12 leading to the location where the product 3 is to be delivered. A filter 13 is inserted across the exhaust pipe 7 in the vicinity of the exhaust-and-force device 8 to prevent the product from flowing into the device 8 during the exhaust step. As seen in FIG. 1, the exhaust pipe 7 is horizontal.

The product 3 is transferred from the tank 1 to the delivery means contemplated in the following manner: after filling the tank 1 with the pulverulent or pasty product 3, the tank 1 is closed by fitting the cover 2 and tightening the screws 4, whereafter the three-way valve 11 is actuated for communicating the exhaust pipe 7 through intake pipe 6a with the outlet orifice 6 and the piston 9 is moved backward or to the right as shown in FIG. 1, to create a vacuum in said exhaust pipe 7. Thus under the dual force of the vacuum and of the weight of the product 3 lying above the level of outlet orifice 6, a predetermined amount of product 3 is conveyed into the exhaust pipe 7 in a direction toward its second end 7b; so as to fill up the exhaust pipe 7 from valve 11 to filter 13. Then, the three-way valve 11 is actuated to interconnect the pipe sections 12 and 7, and the product is expelled from exhaust pipe 7 in a direction toward the first end 7a and forced into the transfer pipe section 12 by moving the piston 9 forwards, i.e. to the left, in chamber 10, as shown in the drawing. The pipe section 7 disposed between the filter 13 and the three-way valve 11 may be utilised for volumetric proportioning purposes. It is only necessary that the volume of this section 7 be equal to one dose and to fill this section 7 completely with the products 3 simply during the backward movement of piston 9.

To prevent the vacuum in tank 1 from exceeding a predetermined value, the cover 2 is provided with a correspondingly gaged safety valve 14.

A modified form of embodiment of the apparatus for carrying out the method of the present invention is illustrated in FIG. 2. In this arrangement, the tank 15 is closed by an imperforate movable cover 16 provided along its outer periphery with a seal 17. The cover is exposed on its upper side to atmospheric pressure. During the suction stroke, the cover 16 responsive to the vacuum created underneath moves downward with the product so that on the one hand the vacuum cannot exceed a predetermined limit value due to the volumetric variation taking place, and on the other hand the cover exerts a pressure on the product, thus assisting the exhaust force exerted by the piston.

In this example the exhaust and force means consist of an exhaust device 18, for example of the impeller or turbine type, and of a source of compressed air 19 for forcing the product towards the delivery means. A three-way valve 20 is also provided for sequentially communicating the exhaust device with pipe section 7 during the exhaust phase, and subsequently communicating the source of compressed air 19 with the pipe section 7 for forcing the product into the delivery pipe 12.

In the above-described form of embodiment the three-way valves 11 and 20 may be controlled either in parallel or with a slight time-lag therebetween.

Of course, the above-described means for exhausting and forcing the product may also be incorporated in the form of embodiment of FIG. 1, and conversely the means utilised in the structure of FIG. 1 are also applicable to the apparatus shown in FIG. 2.

Finally, the modified apparatus shown in FIG. 3 is similar to the apparatus of FIG. 2, except for the suction or outlet orifice 6' being provided through the movable cover 16', and on the other hand the intake pipe section 6'a consists of a flexible hose to that it can follow the cover 16' during its movements within the tank 15'. In this case the suction phase is not assisted by the weight of the product. Nevertheless, the cover 16', moving down with the top level of the product, exerts as in the preceding example a pressure like a piston to force the product into the exhaust pipe section (not shown) while scraping the inner walls of the tank and minimizing the loss of product.

It is worth pointing out that during the forcing phase the filter 13 is cleaned by the air flowing through it, so that maintenance costs are reduced accordingly.

The third form of embodiment of the apparatus for carrying out the method of the present invention is particularly advantageous for transferring products stored in standard tanks or containers. In fact, it is only necessary to close the tank or container by means of a cover 16' provided with a gasket 17' and to operate as explained hereinabove for transferring the product from the tank to its intended destination.

Of course, it is also possible, when the exhaust and forcing means are those illustrated in FIG. 1, and mainly in the case of pasty products likely to clog the filter 13, to dispense with this filter 13 and in this case the product, during the exhaust phase, is caused to penetrate into the cylindrical chamber 10 of cylinder 8 from which it is subsequently ejected by the piston 9 during the forcing-back phase.

Figure 5:
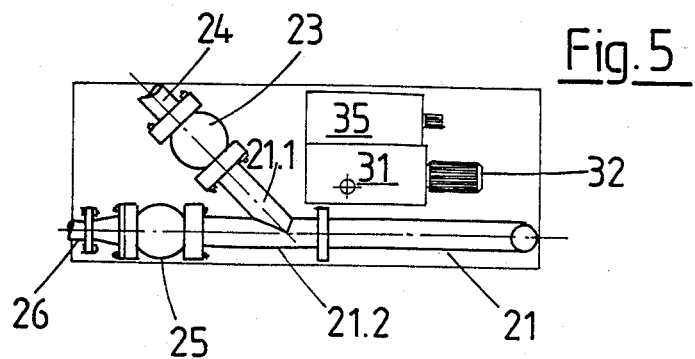
FIG. 5 is a schematic plan view of the apparatus shown in FIG. 4.

The embodiment of the invention shown schematically in FIGS. 4 and 5 comprises an exhaust pipe 21 in the form of a vertical loop provided near its upper end with a filter 22 which permits the passage of air but prevents the passage of the pulverulent material. The lower end of the exhaust pipe is forked to provide a first fork 21.1 connected through a valve 23 with an intake pipe 24 coming from a supply container for the pulverulent material (not shown). A second fork 21.2 is connected by a valve 25 to a transfer pipe 26 which extends to the point where the pulverulent material is to be delivered.

The upper end of the exhaust pipe 21 is also forked. One fork 21.3 is connected through a valve 27, pipe 28, a second filter 29 and a pipe 30 with a suction pump 31 driving by a motor 32. A second fork 21.4 is connected through a valve 33 to a source of compressed air, for example a compressed air tank (not shown).

The apparatus is controlled by circuitry in a control box 35 to operate in the following manner. With valves 25 and 33 closed and valves 23 and 27 opened, suction is applied by the suction pump 31 to the upper end of the exhaust pipe 21 to draw pulverulent material from the supply container (not shown) through the intake pipe 26 into the exhaust pipe 21 where it is blocked by the filter 22. The exhaust pipe 21 is thereby filled with a predetermined amount of pulverulent material.

Valves 23 and 27 are thereupon closed and vales 25 and 33 are opened whereby compressed air is supplied from the compressed air tank (not shown) to the upper end of the exhaust pipe 21. The pulverent material in the exhaust pipe 21 is thereby blown out of the exhaust pipe 21 into and through the transfer pipe 26 to the point where the pulverent material is to be delivered. In flowing through the filter 22, the compressed cleans the filter so that the filter is cleaned each cycle of operation.

The valves 23 and 25 may be ball-type check valves, while the valves 27 and 33 are electromagnetic valves controlled by circuitry in the control box 35. The control circuit includes appropriate timing circuits to provide cyclical operation of the apparatus.

Of course, it would not constitute a departure from the basic principles of the present invention to carry out the same method by using suction or exhaust means and force means common to a plurality of tanks, and transfer selectively the products stored in one of the other of said tanks. In this case, the exhaust and force means are caused to communicate with one or the other of pipes 7, 7' by actuating a set of three-way valves.

What I claim is:

1. Apparatus for transferring pulverent material from a supply container to a delivery point comprising, an elongate tubular exhaust pipe having first and second ends and a filter in said exhaust pipe near said second end, said filter permitting the passage of air but preventing the passage of said pulverent material, an intake pipe extending from said supply container to said first end of said exhaust pipe, a transfer pipe extending from said first end of said exhaust pipe to said delivery point, means for applying suction to said second end of said exhaust pipe, means for supplying air under pressure to said second end of said exhaust pipe, first valve means for connecting said first end of said exhaust pipe alternatively to said intake pipe and to said transfer pipe, second valve means for connecting said second end of said exhaust pipe alternatively to said suction applying means and to said air pressure supplying means, and control means controlling said first and second valve means in a first stage to connect said first end of said exhaust pipe to said intake pipe and to connect said second end of said exhaust pipe to said suction means to draw said pulverent material from said supply container through said intake pipe into said exhaust pipe in a direction from said first end toward said second end, said pulverent material being blocked by said filter, and in a second stage, to connect said first end of said exhaust pipe to said transfer pipe and to connect said second end of said exhaust pipe to said air pressure supplying means to propel said pulverent material toward and out of said first end of said exhaust pipe into and through said transfer pipe to said delivery point, said filter being cleaned by passage of air under pressure there-through.

2. Apparatus according to claim 1, in which said first valve means comprises a three-way valve operable to connect said first end of said exhaust pipe alternatively with said intake pipe and said transfer pipe.

3. Apparatus according to claim 1, in which said second valve means comprises a three-way valve operable to connect said second end of said exhaust pipe alternatively with said suction applying means and said means for supplying air under pressure.

4. Apparatus according to claim 1, in which said supply container comprises a cylindrical container having a fixed bottom and cylindrical side wall and an imperforate movable top wall slidable in sealed relation on said cylindrical side wall and exposed on its upper side to atmospheric pressure.

5. Apparatus according to claim 4, in which said intake pipe is connected with said cylindrical container near the bottom thereof.

6. Apparatus according to claim 4, in which said intake pipe is connected with the interior of said cylindrical container through said top and comprises a flexible hose permitting movement of said top.

7. Apparatus according to claim 1, in which said means for applying suction comprises an exhaust turbine.

8. A process of transferring pulverent material from a supply container to a delivery point which comprises:

providing an elongate tubular exhaust pipe having first and second ends, and a filter in said exhaust pipe near said second end, said filter permitting the passage of air but preventing the passage of said pulverent material, an intake pipe extended from said supply container to said first end of said exhaust pipe and a transfer pipe extending from said first end of said exhaust pipe to said delivery point, connecting said first end of said exhaust pipe with said intake pipe and applying suction to said second end of said exhaust pipe to draw said pulverent material from said supply container, through said intake pipe and into said exhaust pipe in a direction from said first end toward said second end, said pulverent material being blocked by said filter, and thereafter connecting said first end of said exhaust pipe with said transfer pipe and supplying air under pressure to said second end of said exhaust pipe to propel said pulverent material toward and out of said first end of said exhaust pipe into and through said transfer pipe to said delivery point, and to clear said filter by the flow of air therethrough.

9. Apparatus according to claim 1 in which said exhaust pipe comprises a vertical loop having a lower end comprising said first end of said exhaust pipe and an upper end which comprises said second end of said exhaust pipe.

10. Apparatus according to claim 9, in which said first end of said exhaust pipe is forked to provide first and second branches and in which said first valve means comprises a first valve for connecting said first branch of said exhaust pipe with said intake pipe and a second valve for connecting said second branch of said exhaust pipe with said transfer pipe.

11. Apparatus according to claim 10, in which said first and second valves are ball check valves.

12. Apparatus according to claim 9, in which said second end of said exhaust pipe is forked to provide first and second branches and in which said second valve means comprises a first valve for connecting said second end of said exhaust pipe with said suction applying means and a second valve for connecting said second end of said exhaust pipe with said air pressure supplying means.

13. Apparatus according to claim 12, in which said first and second valves are electromatically controlled valves.

14. Apparatus according to claim 1, in which said exhaust pipe is of uniform diameter between said first valve means and said filter.

15. Apparatus according to claim 1, in which said exhaust pipe is horizontal.

* * * * *